United States Patent
Walder et al.

(10) Patent No.: US 6,660,167 B1
(45) Date of Patent: Dec. 9, 2003

(54) METHOD FOR PRECIPITATING OR FLOCCULATING SUBSTANCES OUT OF SOLUTIONS

(75) Inventors: Gerhard Walder, Zirl (AT); Klaus Leiter, Völs (AT)

(73) Assignee: Watercryst chemiefreie Wasserbehandlung GmbH, Kematen in Tirol (AT)

( * ) Notice: Subject to any disclaimer, the term of this patent is extended or adjusted under 35 U.S.C. 154(b) by 0 days.

(21) Appl. No.: 09/646,855

(22) PCT Filed: Mar. 22, 1999

(86) PCT No.: PCT/EP99/01921

§ 371 (c)(1),
(2), (4) Date: Sep. 22, 2000

(87) PCT Pub. No.: WO99/48822

PCT Pub. Date: Sep. 30, 1999

(30) Foreign Application Priority Data

Mar. 24, 1998 (EP) .............................. 98105346

(51) Int. Cl.$^7$ ............................................. B01D 21/01
(52) U.S. Cl. ..................................... 210/714; 210/748
(58) Field of Search ................................ 210/660, 681, 210/683, 687, 714, 748, 263

(56) References Cited

U.S. PATENT DOCUMENTS

| 4,771,307 A | 9/1988 | Kuno |
| 4,772,307 A | 9/1988 | Kiss et al. |
| 6,059,974 A | * 5/2000 | Scheurman, III |

FOREIGN PATENT DOCUMENTS

| DE | 3534472 | 4/1987 |
| DE | 4400982 | 9/1994 |
| EP | 0544225 | 6/1993 |

* cited by examiner

*Primary Examiner*—Duane Smith
*Assistant Examiner*—Jason M. Greene
(74) *Attorney, Agent, or Firm*—Friedrich Kueffner

(57) ABSTRACT

In a method for precipitating or flocculating substances out of a solution, the solution is brought into contact with at least one ion exchange material having a surface provided with functional groups loaded with counter ions. The precipitation or flocculation is effected catalytically without exchange of the counter ions for ions contained in the solution.

17 Claims, 3 Drawing Sheets

METHOD FOR PRECIPITATING OR FLOCCULATING SUBSTANCES OUT OF SOLUTIONS

BACKGROUND OF THE INVENTION

1. Field of the Invention

The invention relates to a method for precipitating or flocculating substances out of solutions.

2. Discussion of the Relevant Art

Undesirable ionic substances contained in water can be removed when they are transformed into the form of a sparingly soluble salt or mineral and are thus precipitated. Many metal ions, such as, for example, $Ca^{2+}$, $Mg^{2+}$, $Fe^{2+}$, $Me^{2+}$ ions can be precipitated in the form of sparingly soluble hydroxides. Such reactions can be controlled via the pH value.

$Ca^{2+}$ ions in water are removed on a commercial scale in that they are precipitated as $CaCO_3$ (calcium carbonate) (decarbonization) This reaction is also controlled via the pH value.

Closely related to the precipitation of substances contained in water is the term of flocculation and sedimentation. This is so because the removal of (precipitated) substances contained in water requires:that they can also be separated from the water. In the context of flocculation and sedimentation it is important how the precipitated products grow further and/or can conglomerate. The addition of certain salts (aluminum salts, iron salt) can control this behavior.

In the conventional method technology it is difficult to avoid a local overdosage when introducing the flocculation agent (for example, when adding sodium hydroxide solution or when dissolving sodium hydroxide pellets). A local overdosage can result in the precipitation of inherently less soluble substances contained in the water which then cause, as an entrained solid particle, component hard-to-control conditions in the subsequent precipitation process.

SUMMARY OF THE INVENTION

It is an object of the invention to provide an improved method for precipitation or flocculation of substances contained in solutions, especially water.

According to the invention, the method is characterized in that the solution is brought into contact with at least one ion exchange material which releases ions into the solution that effect precipitation or flocculation and/or has on its surface functional groups which catalytically effect flocculation or precipitation.

Ion exchange materials have been used in water or sewage treatment in order to exchange undesirable ions against desirable ions or ions that are less disruptive for the respective application purposes. Known are, for example, water softening devices which by means of ion exchangers bind $Ca^{2+}$ and/or $Mg^{2+}$ in exchange for $Na^{2+}$ or $H^+$ ions. Anionic exchangers (mostly in the $Cl^-$ or $OH^-$ form) allow the removal of undesirable anions ($NO_{3-}$, $HCO_{3-}$ etc.) from the water. Known are also methods in which the $Cu^{2+}$ ion or heavy-metal ions are removed by means of ion exchangers from the water. All these methods have in common that the ions removed from the water are bonded to the resin; once the capacity of the resin is depleted, it must be regenerated. During the regeneration process, the metal ions which have been concentrated can be, for example, removed from the regenerated compound.

Novel is now the idea to employ an ion exchange material for inducing a precipitation or flocculation process.

According to a first aspect of the invention, ion exchange materials are used as supports for the ions which in solution make the precipitation reaction possible. The component required for transformation of the ionic species to be precipitated into a sparingly soluble salt/mineral is provided by the ion exchange material which has been conditioned for this purpose. For example, an ion exchange resin of the $OH^-$ form provides the required $OH^-$ ions for a hydroxide precipitation in order to, for example, precipitate $Fe^{2+}$ and $Mn^{2+}$ in the form of hydroxides but of the water. $Ag^+$ ions in the water can be precipitated as AgCl in the presence of an anionic exchange resin of the $Cl^-$ form.

When using specially conditioned ion exchange materials, the following advantages will result relative to the prior art in the field of water treatment:

The ion exchange material allows the directed addition of the components required alone for the precipitation reaction, for example, for the decarbonization of calcium carbonate-containing water. The principle of decarbonization of calcium carbonate-containing water is that the pH value is to be raised in order to shift the calcium carbonate/carbonic acid equilibrium such that the $Ca^{2+}$ ions will precipitate in the form of calcium carbonate. Conventionally, the pH value increase is achieved by adding $Ca(OH)_2$ NaOH and/or $NaCO_3$. This addition has the disadvantage that with the $OH^-$ or $CO_3^{2-}$ ions acting as a base, additionally $Ca^{2+}$ or $Na^{30}$ ions are introduced into the water which partially counteract (additional $Ca^2+$ ions which must be precipitated) or limit (sodium limit value in drinking water) the success of the method.

A weakly basic ion exchange resin of the $OH^-$ form only releases $OH^-$ ions; an ion exchange resin of the $HCO_{3-}/CO_3^{2-}$ releases only $CO_3^{2-}$ and $HCO_{3-}$ ions.

Better control of the precipitation process by avoiding local overdosage, especially in combination with a fluidized bed variant.

The possibility of controlling the precipitation process by means of the contact time of the water to be treated with the ion exchange material.

The ion exchange is a surface process and depends on the degree of loading of the ion exchange material with the ions required for the reaction and the type and concentration of ions in the solution which can be exchanged for the ions on the resin.

The contact time can be adjusted simply and can be changed optionally (by the size of the ion exchange resin bed and the flow-through amount in continuous operation; via the residence time in the reaction vessel (tank) during batch operation).

The recyclability of the ion exchange material.

Depleted ion exchange material, especially resins, can be removed easily from the reaction vessel or tank and regenerated. The regenerated material can then be returned into the process.

Ion exchange materials can be used as carriers of ions which control the flocculation in solution. In analogy to the above described mechanism, ions which enhance the flocculation of substances contained in the water (for example, $Al^{3+}$ and $Fe^{3+}$ ions) can also be brought into the corresponding solution by ion exchange from an ion exchange material (it is then required to provide an ion exchange material that is at least partially loaded with $Al^{3+}$ and $Fe^{3+}$ ions). All advantages are also applicable here.

For certain processes, the combination of dosage of pH-controlling ions (for example, anionic exchangers of the OH⁻ form) and flocculation agents (for example, cationic exchangers in the $Fe^{2+}$ form) is expedient.

According to a second aspect of the invention, a specially conditioned ion exchange material can be used as a catalyst for precipitation of substances contained in water. In many real solutions there is the situation that the solution, when considered thermodynamically, is oversaturated with respect to a dissolved phase. Despite this fact, within a finite time period no precipitation takes place which would bring the solution into equilibrium. Such meta-stable solutions lack suitable growth locations where the precipitation could take place. Suitable growth locations are crystal seeds of the phase to be precipitated or special heterogeneous surfaces which decrease considerably the seed formation work and thus make the formation of crystal seeds in the range of low saturations possible. An example for such a solution is water which is oversaturated with respect to calcium carbonate.

It is known that biological systems (muscles, algae etc.) are able to initiate a directed crystal seed formation by means of certain functional groups. In particular, it was found that the carboxyl group of certain carboxylic acids (stearic acid etc.) induces calcium carbonate crystal seed formation. In regard to a mechanism of this reaction, it is assumed that carboxyl groups first bind $Ca^{2+}$ ions from the water and that only this combination is able to induce the calcium carbonate crystal seed formation.

Ion exchange materials obtain their specific properties also as a result of certain functional groups: strongly acidic ion exchange materials carry as active functional groups, for example, the sulfonate group; weakly acidic ion exchangers have as active functional groups, for example, the carboxyl group (COO⁻).

When the carboxyl group of a weakly acidic ion exchange material is loaded by means of a loading process preferably completely with $Ca^{2+}$ ions, this loaded material is suitable to catalytically form $CaCO_3$ crystal seeds on its surface in aqueous calcium carbonate-containing solutions.

Such a conditioned weakly acidic ion exchange material can be used, for example, as a nucleus-forming agent and filter pellet in conventional decarbonization devices; and, furthermore, for the increase of the seed formation rate and thus the efficiency in the method and device described in the German patent application DE 19606633 A1. The contents of DE 19606633 A1 is included in the disclosure of the present application.

The catalytic efficiency depends on the bonding strength (electrostatic association) between carboxyl group and the $Ca^{2+}$ ion: a bond which is too strong would not make possible the association of carbonate ions from the solution required for the seed formation; a bonding that is too loose would result in the loss of $Ca^{2+}$ and thus in the destruction of the catalytic complexes. The electrostatic association of carboxyl groups and $Ca^{2+}$ ions on the interface ion exchange material/water is affected by the electrical field on the interface. The catalytic efficiency of these specially loaded ion exchange materials is accordingly increased when they are, for example, applied to the electrodes described in the international application WO 95/26931 or produces them therefrom and, in this way, modulates or adjusts the functional groups by means of the described intrinsic electrical field. The contents of WO 95/26 931 thus is included in the disclosure of the present application.

EMBODIMENTS

The decarbonization of calcium carbonate-containing water via the directed dosage of OH⁻ ions via an ion exchange resin:

On a commercial scale, the decarbonization of calcium carbonate-containing water has been realized in that, by addition of certain chemicals (milk of lime, sodium hydroxide, soda), the pH value of the water was raised and thus the calcium carbonate/carbonic acid equilibrium was shifted greatly toward oversaturation. The resulting homogenous seed formation generated calcium carbonate crystal seeds on which the calcium carbonate dissolved in water then would precipitate ($Mg^{2+}$ ions precipitate as $Mg(OH)_2$).

The success of the method depends greatly on the type of process control.

The use of sodium hydroxide for increasing the pH value is a problem because at the location of addition of the sodium hydroxide an extreme pH value increase results locally which causes the precipitation of undesirable hydroxides. These hydroxides, for example, $Ca(OH)_2$ colloids, are entrained as solid bodies into the process water and make the required pH value adjustment after the decarbonization process more difficult.

The problem when using milk of lime ($Ca(OH)_2$) lies in the preparation of the solution to be added and the addition: it is practically impossible to produce a dosage solution which is free of $Ca(OH)_2$ colloids. When these colloids are not completely dissolved in the decarbonization step, they present a great problem in the pH value reduction required subsequently.

The addition of milk of lime also adds further $Ca^{2+}$ ions to the water which in the subsequently precipitation process are only partially precipitated also. Often, additional carbonate (in the form of soda-$Na_2CO_3$) must be added in order to be able to satisfactorily remove $Ca^{2+}$ ions by precipitation. However, this also results in the undesirable increase of the $Na^+$ contents in the water.

The goal of an optimal process control is furthermore a controlled seed formation rate: too many crystal seeds compete in regard to their growth and grow only to small calcium carbonate crystals which can be separated only with difficulty from the process water (sedimentation speed is too low, filtration is complex).

The use of a (strongly basic) anionic exchanger (for example, of the OH⁻ form) makes it possible to have an optimal process control.

DESCRIPTION OF PREFERRED EMBODIMENTS

Figure 1:
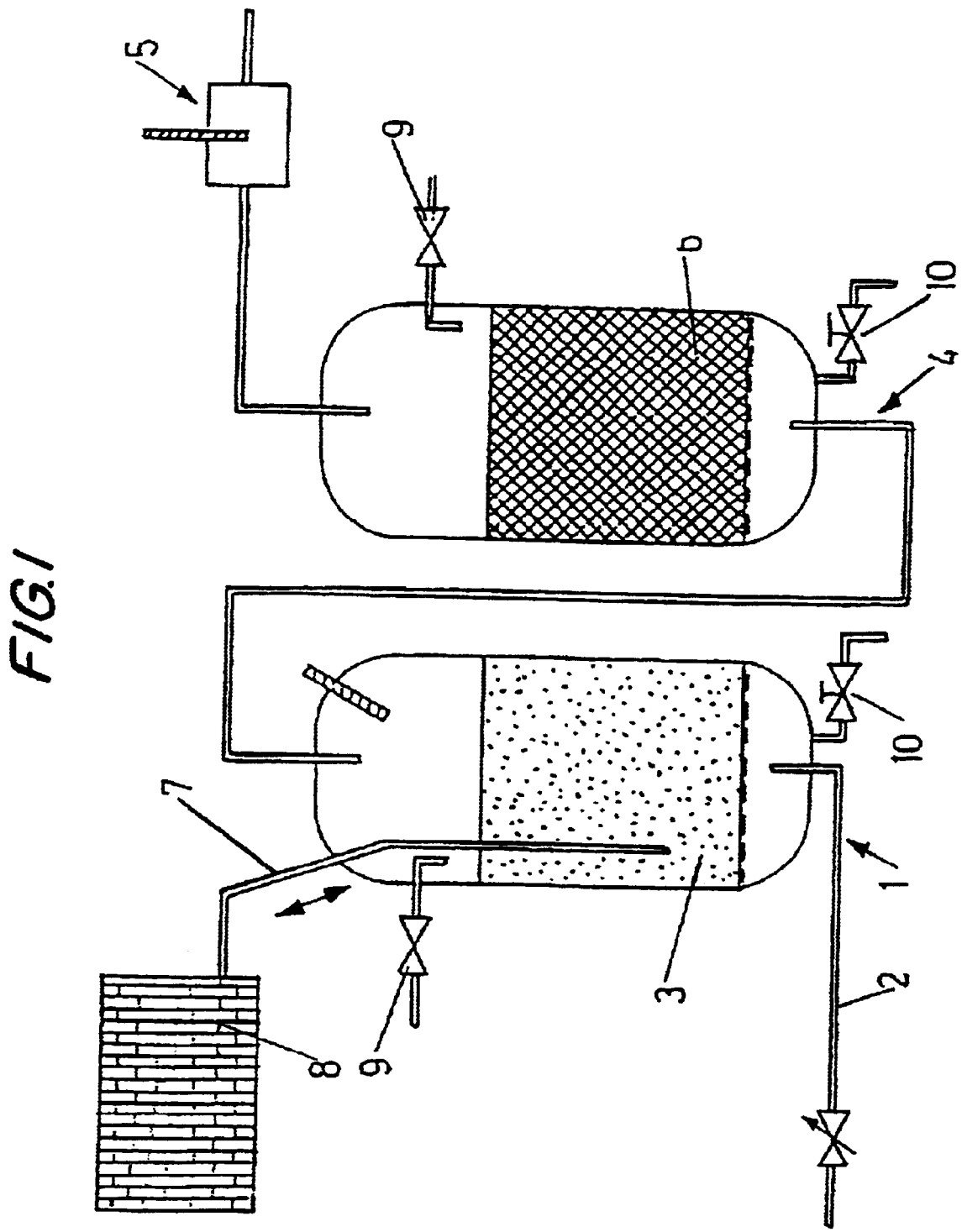
In FIG. 1 a schematic of a decarbonization device that operates on the basis of strongly basic anionic exchangers is illustrated.
Figure 2:
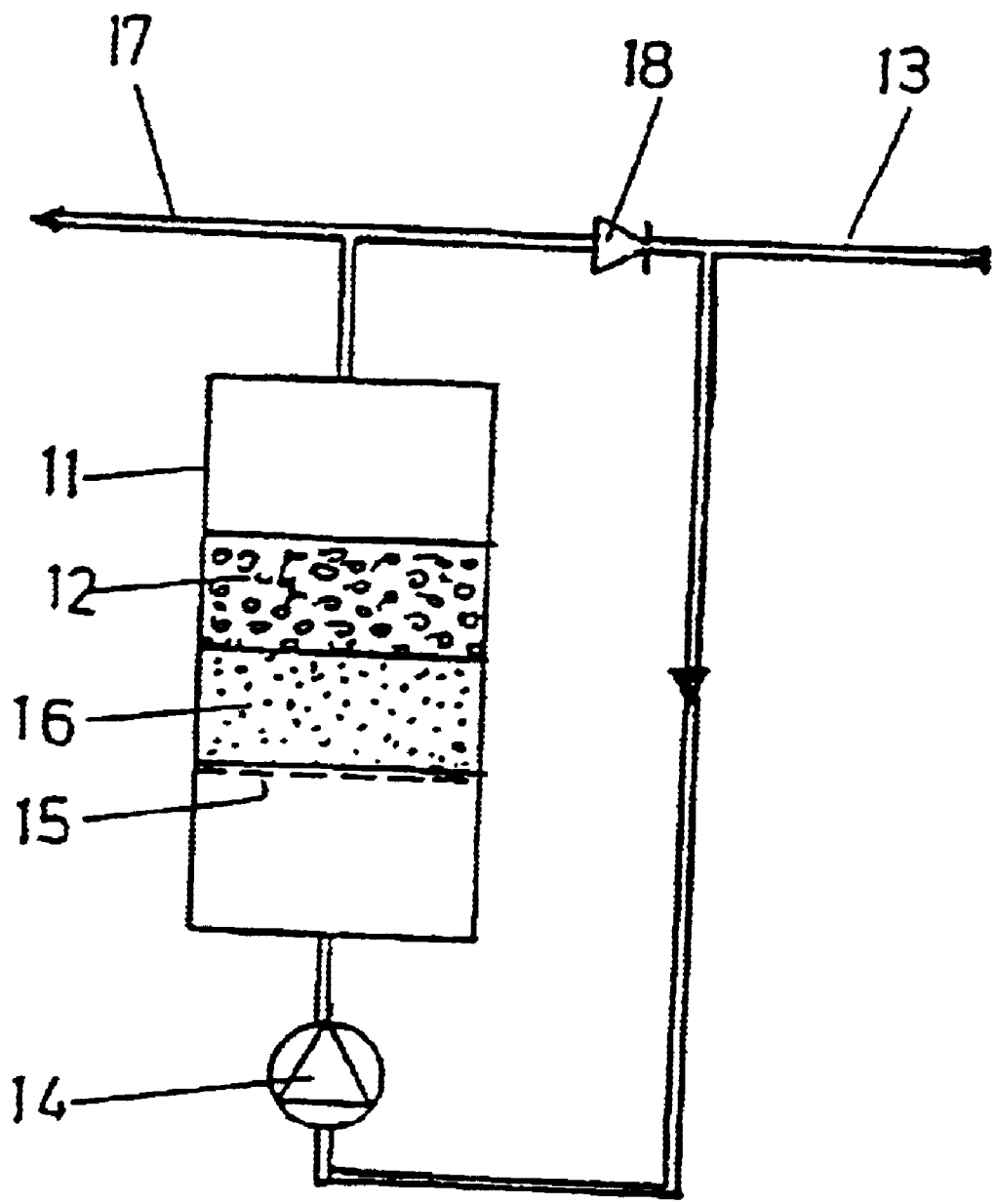
FIG. 2 shows a device for producing seed crystals.

In the decarbonization stage 1 of FIG. 1 the raw water flows via the line 2 first through a bed of strongly basic ion exchange material 3; by means of ion exchange the pH value of the water is adjusted to a pH value between 9 and 10 (depending on decarbonization efficiency). The control of the pH value. is carried out by means of the average contact time of the raw water with the ion exchange material 3 (flow-through, resin amount). By raising the pH value, a homogeneous seed formation results, and, accordingly, calcium carbonate precipitation is caused. The precipitated calcium carbonate is separated in the following filter stage 4 according to the prior art by sedimentation and/or filtration from the process water (sedimentation filter 6). In the third stage 5 the pH value is optionally adjusted.

In order to make possible the continuous operation of such a device, it is expedient to regenerate the ion exchange material continuously. This is carried out best in that a part of the partially spent material 3 is removed from the bed, for example, by a vacuum and supply line 7. The removed amount is replaced by a corresponding amount of freshly regenerated ion exchange material 3, is regenerated (regeneration is carried out in the regeneration device 8, for example, with acids or electrolytically, wherein at the same time disinfection and washing can occur) and is then available for further use.

Expediently, the device (stage 1) is operated by fluidized bed operation. With the ion exchange material supply and removal device, used ion exchange material is removed periodically or continuously from the fluidized bed and replaced by fresh resin. Cleaning is possible by means of backwash lines 9 and the flushing outlets 10.

In order to raise for hard water with a total hardness of 4 mmol/l, a DIC contents of also 4 mmol/l, and a pH value of 8.0, the pH value to approximately 9.5, approximately 1 mmol/l base or $OH^-$ ions are required. A strongly basic ion exchanger of the $OH^-$ form, for example, Lewait MP 600 of the firm Bayer/5/, has a capacity of typically 1 val/l, i.e., based on the requirement of 1 mmol/l $OH^-$ ions per liter raw water, approximately 1000 liters can be correspondingly treated per liter resin.

The resin amount required for a certain treatment efficiency depends on the contact time resin/water required for the pH value increase. In the above described water, a contact time of approximately 30 seconds is sufficient for a pH value increase to 9.5. For a decarbonization device with an output of 100 $m^3$/h this results in a required resin amount of approximately 850 liters.

Iron Removal, Demagnetization of Water

In a similar manner the reduction of iron and manganese ions from the water can be carried out. For this purpose, preferably a weakly basic anionic exchanger material, for example, Lewait MP62 of the firm Bayer, is used because, generally, only a medium pH value increase is required in order to initiate the precipitation of iron and manganese hydroxides.

In order to improve flocculation of the hydroxides, it is beneficial to add in minimal amounts to the resin bed a resin which is loaded with aluminum ions or complexes (for example, a strongly acidic ion exchange resin Lewait S 100 of the firm Bayer loaded with aluminum ions).

Catalytic Precipitation of Calcium Carbonate

A weakly acidic ion exchange material preferably completely loaded with $Ca^{2+}$ ions, for example, a resin Lewait CNP 80 of the firm Bayer, triggers in calcium carbonate-containing solutions catalytically calcium carbonate crystal seed formation.

The latter resin can be used, for example, in order to enhance or to replace the above described decarbonization. In the process control of decarbonization it is favorable not to allow the pH value to become too high in order to maintain a crystal seed concentration that is not too great. A pH value that is too great increases also the expenditure of the subsequent pH value reduction. A crystal seed density that is too high results in many small calcium carbonate crystals which can be separated only with difficulty from the water. A weakly acidic resin of the $Ca^{2+}$ form forms crystal seeds also for low oversaturation. With the use of this resin it is possible to control the process such that the pH values must not be controlled above the pH value 9 so that the oversaturation remains in a range in which no sudden high crystal seed density is generated.

The converted CNP 80 can be dried, ground, and applied as a thin layer onto a support, for example, the electrodes disclosed in the international application WO 95/26931. With the intrinsic field of such a coated electrode, the catalytic activity of the functional groups can be controlled. In this manner, the directed crystal seed formation can be initiated. This effect can be used in water treatment in order to supply a defined amount of calcium carbonate crystal seeds to the process water.

In this context, the invention is in no way limited to known ion exchange materials. It is only important that the employed material can carry active groups which are able to receive ions from the solution and to release others instead. These groups therefore must have a finite dissociation constant in the liquid in question.

In order for the materials to have catalytic properties, it is additionally advantageous when those materials are used which have a microstructure favorable for the crystallization. This is, for example, the case when the basic matrix onto which the groups are applied, is a two-dimensional template which has a good conformity with the lattice constant of the crystal to be formed so that electrostatic and stereochemical conditions as in the crystal to be formed are present. The active groups are then to be prepared such that at least an ionic component of the substance to be crystallized is absorbed. It is then able in the oversaturated solution to initiate crystal seed formation on the interface.

In this respect, suitable materials (matrix or support materials) are preferably polyacrylate, polystyrene, activated carbon (as granules or porous semi-finished parts in the form of disks, cylinders, hollow cylinders) which can be functionalized preferably with a carboxyl group. The carboxyl group is usually saturated during the manufacturing process in the $H^+$ form. In order to use this material, for example, for the catalytic crystallization of calcium carbonate, the $H^+$ ions are replaced by cations of sparingly soluble salts (for example, $Ca^2$, $Mg^{2+}$, $Fe^{2+}$, $Cu^{2+}$ etc.) so that in the end an ion exchange material in the respective cationic form is present ($Ca^{2+}$ form, $Mg^{2+}$ form, $Fe^{2+}$ form, $Cu^{2+}$ form etc.). The geometric position of the $Ca^{2+}$ ions on the surface of a polyacrylate resin ball of the weakly acidic ion exchange resin Lewatit CNP80 of the firm Bayer is determined by the molecular geometry of the polyacrylate matrix. The thus produced surface now exhibits good electrostatic and stereochemical properties for the formation of $CaCO_3$ crystals.

As already mentioned above, the electrostatic and stereochemical properties are important for the catalytically induced formation of crystal seeds on the respective surface. The stereochemical and substantially also electrical properties are adjusted via the structure of the basic material (for example, polyacrylate) on which the active groups are seated.

The electrostatic properties can be affected additionally by an external electrostatic field. In a simple way, this can be realized by introducing the catalyst material between two field-generating electrodes. As a concrete realization for this purpose, the container wall (for example, of a fluidized bed reactor) can be switched as a cathode and an anode can be positioned centrally within the tank.

However, an especially elegant variant results when the catalyst material is applied as a thin layer on an electrode, as is described, for example, in the international application WO 95/26931, and the electrostatic properties of the catalytic boundaries are adjusted by means of an intrinsic field.

FURTHER APPLICATION EXAMPLES

Example 1

Such a catalyst can be used for the formation of seed crystals which are distributed by the water flow in the installation and pipeline system downstream. Accordingly, seed crystals thus are formed as the precipitation product. It is known that such crystal seeds can prevent by their growth process the deposition on pipe walls or heat registers of hot water heaters. For the protection of a drinking water installation in a household, it is, for example, possible to use a fluidized bed reactor 11 (volume approximately 6 to 8 liters, diameter 15 cm, height 60 cm) with a catalyst filling (for example, four liters). The catalyst bed 12 is, for example, formed by a weakly acidic cationic exchanger of the $Ca^{2+}$ form (Lewait CNP90 of the firm Bayer). The raw water flows from the inlet 13 via a pump 14 and a jet bottom 15 as well as a support layer 16 of quartz sand through the catalyst 12. By means of the pump 14 the catalyst bed is permanently fluidized (circulation) via the check valve 18 and the pump 14. The constant flow and friction of the catalyst granules prevents blockage of the granules and additionally enhances the detachment of the crystal seeds from the catalyst surface. The crystal seeds are carried out by the removal of water (line 17) as crystallization seeds into the attached installation system.

Example 2

A catalytically active material prepared such is especially suitable as a bottom deposit for a method for treatment of water as disclosed in German patent DE 19606633 A1.

In the decarbonization of drinking water with high calcium carbonate contents by means of pH value increase with $Ca(OH)_2$ (typical pH values>12), the following method disadvantages are known:

High turbid substance contents in the overflow water of the reactor and thus the necessity of a filtration stage downstream.

High pH value of the product water must be lowered with great expense.

High use of chemicals.

By using a catalytically active material (for example, weakly acidic cationic exchanger of the $Ca^{2+}$ form) in the reactor, the above-mentioned disadvantages can be practically completely prevented. The pH value must only be raised minimally (to a maximum of 9) in order to generate at the catalytic surfaces a sufficient seed formation. Accordingly, primarily chemicals, a filtration stage and neutralization stage can be saved.

Figure 3:
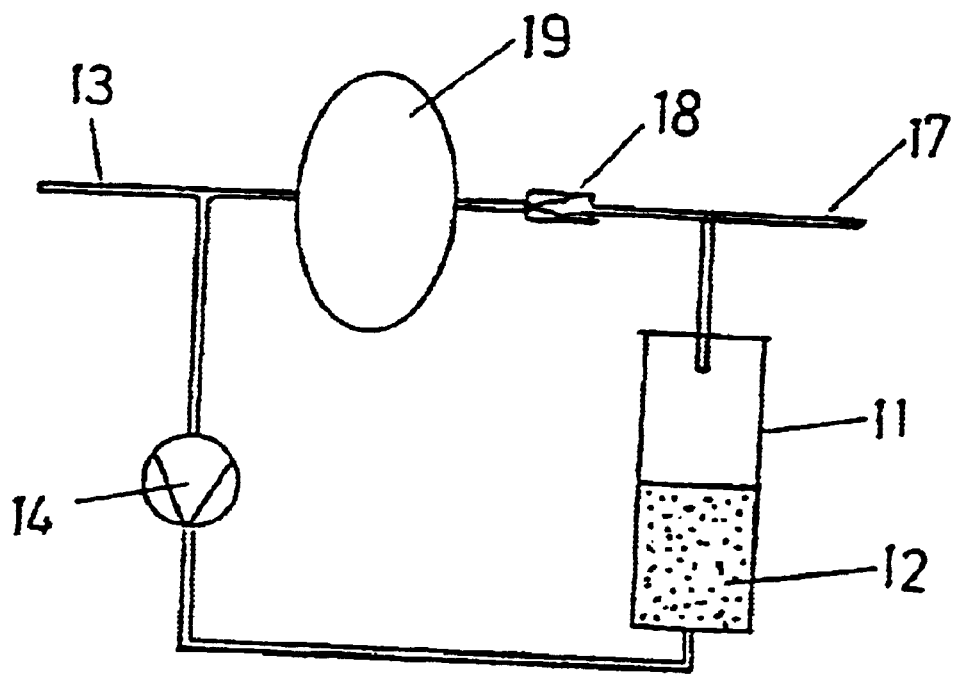
FIGS. 3 and 4 show further embodiments of a device suitable for performing the method according to the invention.
Figure 4:
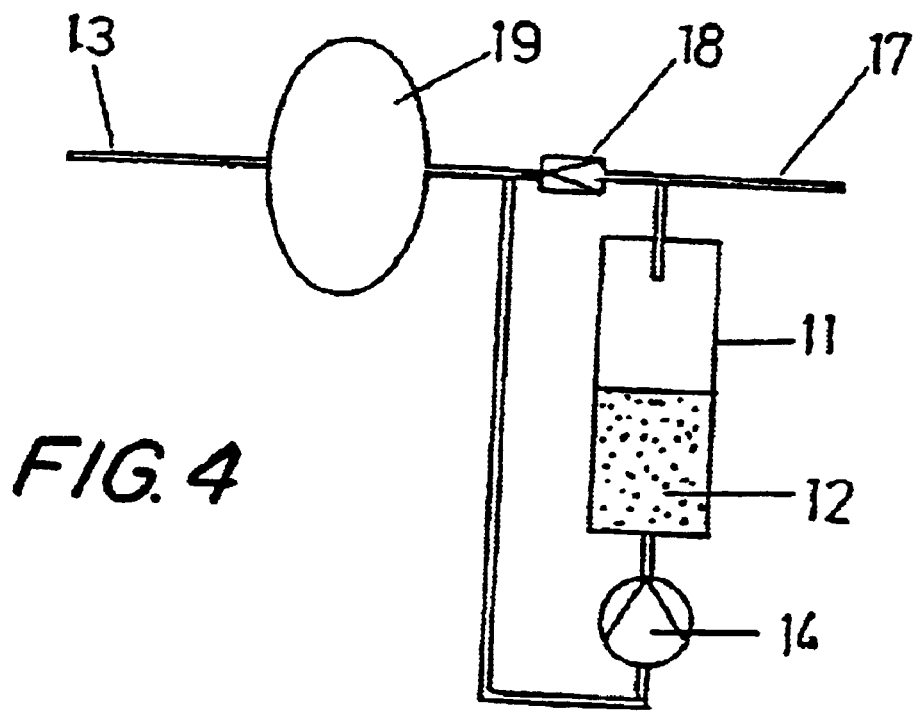

In the embodiments illustrated in FIGS. 3 and 4, the water treatment by means of a catalytically active ion exchange material 12, which is arranged in a container 11, is combined with a preferably physical water treatment device 19. Such a physical water treatment device can operate, for example, electrostatically. Water treatment devices as they are described in the international application WO 95/to 6931 and the German patent application DE 19606633 are especially suitable.

Advantageosuly, the water to be treated, especially for decalcification, is guided by pump 14 in circulation through the ion exchange material. The water treatment device 19 can either be mounted within this circuit (FIG. 3) or can be arranged downstream of this circuit (FIG. 4).

What is claimed is:

1. A method for precipitating or flocculating a substance out of a solution, the method comprising the steps of:

providing at least one ion exchange material having a surface provided with functional groups loaded with counter ions;

bringing a solution into contact with the at least one ion exchange material; and effecting precipitation or flocculation of a substance catalytically without exchange of the counter ions for ions contained in the solution.

2. The method according to claim 1, wherein the counter ions are cations.

3. The method according to claim 2, wherein the counter ions are selected from the group consisting of $Ca^{2+}$, $Fe^{2+}$, and $Cu^{2+}$.

4. The method according to claim 1, wherein the counter ions comprise at least one ionic component of the substance to be precipitated or flocculated.

5. The method according to claim 4, wherein, when the solution is water, the counter ions are $Ca^{2+}$ ions for forming calcium carbonate crystal seeds.

6. The method according to claim 5, wherein the ion exchange material is weakly acidic.

7. The method according to claim 6, wherein the functional groups are carboxyl groups ($COO^-$) carrying the counter ions.

8. The method according to claims 7, wherein the counter ions are Ca2+.

9. The method according to claim 1, further comprising the step of exposing the surface of the ion exchange material in contact with the solution to an electrical field.

10. The method according to claim 9, wherein the electrical field is adjustable.

11. The method according to claim 9, further comprising the step of arranging electrical field-generating electrodes in or on the ion exchange material such that the solution is not present between the electrical field-generating electrodes.

12. The method according to claim 1, further comprising the step of circulating the solution along the ion exchange material or through the ion exchange material.

13. The method according to claim 1, further comprising the step of passing the solution along or through the ion exchange material and guiding the solution additionally through a physical water treatment device.

14. The method according to claim 1, wherein the solution to be treated is water.

15. The method according to claim 1, wherein the ion exchange material is comprised of polyacrylate, polystyrene or active carbon and wherein a surface of the polyacrylate, polystyrene or active carbon carries the functional groups.

16. The method according to claim 1, further comprising the step of removing the precipitated or flocculated substance from the solution.

17. The method according to claim 1, wherein the precipitated or flocculated substance forms seed crystals.

\* \* \* \* \*